(12) United States Patent
Kahe (10) Patent No.: US 10,781,771 B1
(45) Date of Patent: Sep. 22, 2020

(54) AUTOMATIC COOLING SYSTEM FOR COMBUSTION ENGINE

(71) Applicant: Ghasem Kahe, Tehran (IR)

(72) Inventor: Ghasem Kahe, Tehran (IR)

(*) Notice: Subject to any disclaimer, the term of this patent is extended or adjusted under 35 U.S.C. 154(b) by 0 days.

(21) Appl. No.: 16/578,367

(22) Filed: Sep. 22, 2019

(51) Int. Cl.
*F02G 1/047* (2006.01)
*F01P 7/14* (2006.01)

(52) U.S. Cl.
CPC ............... *F02G 1/047* (2013.01); *F01P 7/14* (2013.01); *F01P 2037/00* (2013.01); *F02G 2256/50* (2013.01)

(58) Field of Classification Search
CPC ........... F02G 1/00–06; F02G 5/00–04; F02G 2243/00–54; F02G 2280/50; F01P 5/00; F01P 5/10; F01P 5/12; F01P 2005/105; F01P 7/14–167; F01P 2007/143; F01P 2007/146; F01P 2007/168
USPC .......... 60/508–515, 517–531, 597, 614, 615, 60/645, 660, 682, 912; 123/41.01, 41.02, 123/41.18, 41.44
See application file for complete search history.

(56) References Cited

U.S. PATENT DOCUMENTS

| | | | | |
|---|---|---|---|---|
| 3,858,802 A * | 1/1975 | Stobart | ............ | F02G 1/055 237/12.1 |
| 3,906,728 A * | 9/1975 | Kantz | ............ | F04D 29/22 60/524 |
| 3,959,971 A * | 6/1976 | Mekari | ............ | F02G 1/053 60/517 |
| 4,123,916 A * | 11/1978 | Kreger | ............ | B60H 1/00007 62/243 |
| 4,227,374 A * | 10/1980 | Oxley | ............ | F01K 3/00 60/651 |
| 4,488,853 A * | 12/1984 | Benson | ............ | F01B 11/00 417/240 |
| 5,010,734 A * | 4/1991 | Ho | ............ | F01P 3/22 60/517 |
| 5,228,293 A * | 7/1993 | Vitale | ............ | F02G 1/0435 60/641.14 |
| 5,385,021 A * | 1/1995 | Beale | ............ | F01B 11/00 60/520 |
| 5,557,934 A * | 9/1996 | Beach | ............ | F01B 9/042 123/197.4 |

(Continued)

FOREIGN PATENT DOCUMENTS

| | | | | |
|---|---|---|---|---|
| DE | 2855071 A1 * | 7/1980 | ............ | F01P 5/10 |
| DE | 2855167 A1 * | 7/1980 | ............ | F02G 5/00 |

(Continued)

*Primary Examiner* — Mark A Laurenzi
*Assistant Examiner* — Mickey H France (57) ABSTRACT

The present invention discloses an automatic cooling system based on stirling engine for combustion engine. The system is configured to utilize thermal energy from the temperature difference between the engine and a radiator to feed the stirling engine. The stirling engine drives a coolant pump to circulate a coolant between the engine and the radiator. If the temperature difference between the combustion engine and the radiator is high, the stirling engine automatically drives the coolant pump and circulates the coolant at high speed. If the temperature difference between the combustion engine and the radiator is low, the stirling engine automatically drives the coolant pump and circulates the coolant at low speed, until the temperature difference between the engine and radiator within a threshold point. Therefore, there is no need for a thermostat and a water pump coupled with the engine.

16 Claims, 5 Drawing Sheets

(56) References Cited

U.S. PATENT DOCUMENTS

| | | | | |
|---|---|---|---|---|
| 2005/0115242 | A1* | 6/2005 | Conrad | F02G 1/0435 60/714 |
| 2007/0204610 | A1* | 9/2007 | Hatta | H01L 21/67103 60/520 |
| 2007/0209359 | A1* | 9/2007 | Yaguchi | F02G 5/02 60/520 |
| 2009/0013686 | A1* | 1/2009 | Yaguchi | F02G 5/02 60/597 |
| 2010/0095908 | A1* | 4/2010 | Deivasigamani | F01P 7/16 123/41.1 |
| 2010/0146962 | A1* | 6/2010 | Yaguchi | F02G 1/043 60/520 |
| 2010/0257858 | A1* | 10/2010 | Yaguchi | F02G 1/053 60/525 |
| 2012/0216559 | A1* | 8/2012 | Yamada | H01L 21/67109 62/259.2 |
| 2013/0269343 | A1* | 10/2013 | Kobylecky | F02G 5/04 60/615 |
| 2013/0306004 | A1* | 11/2013 | Katayama | F01P 3/00 123/41.1 |
| 2014/0020376 | A1* | 1/2014 | Katayama | F02G 1/047 60/524 |
| 2014/0230428 | A1* | 8/2014 | Komori | F02G 1/045 60/517 |
| 2015/0380748 | A1* | 12/2015 | Marich | H01M 8/0435 429/423 |
| 2016/0010588 | A1* | 1/2016 | Ge | F02G 1/055 60/620 |

FOREIGN PATENT DOCUMENTS

| | | | | |
|---|---|---|---|---|
| DE | 102006012128 A1 | * | 1/2008 | F02G 1/043 |
| GB | 2437309 A | * | 10/2007 | F02G 1/043 |
| JP | 01294946 A | * | 11/1989 | F02G 1/043 |

* cited by examiner

AUTOMATIC COOLING SYSTEM FOR COMBUSTION ENGINE

BACKGROUND OF THE INVENTION

Figure 1:
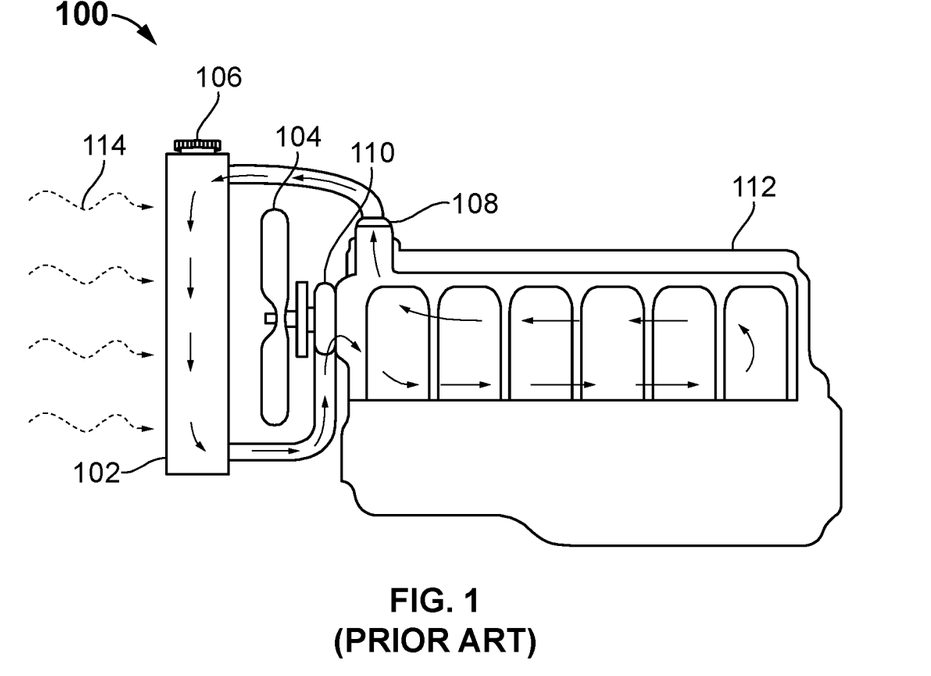
FIG. 1 exemplarily illustrates a prior art cooling system of a combustion engine according to an embodiment of the present invention.

An internal combustion engine utilizes air and fuel to create combustion within the various combustion cylinders. Combustion causes movement of the piston within the combustion cylinder which is transferred to the crankshaft and other moving parts of the engine for various purposes. The combustion process generates heat that is transferred throughout the engine. To avoid the damage of engine and wastage of heat energy, the engine is provided with a cooling system. The cooling system utilizes different coolants such as gaseous or liquid coolant to control the engine temperature. Referring to FIG. 1, in an automotive engine 112 with a liquid cooling system 100, the engine 112 is provided with a passage inside the engine block for circulating the coolant.

The heat absorbing coolant circulates through the passage in the engine 112 and absorbs the engine heat. The engine coolant is introduced into a radiator 102, which dissipates the heat that the coolant has absorbed from the engine 112. Radiator 102 is typically mounted in a position where it receives airflow 114 from the forward movement of the vehicle. The system 100 further comprises an axial fan 104 to force air through the radiator 102. The radiator 102 further comprises a pressure release cap 106 to pressurize the cooling system 100. The cooled liquid coolant is then transferred back into the engine 112 via the passage and repeats the process.

A circulation pump 110 driven by the engine 112 circulates the coolant between the engine 112 and radiator 102. A thermostatic valve 108 is located in the pipeline coupled to the engine 112, for closing the passageway when the coolant temperature in the engine 112 is below a predetermined value, thereby preventing the coolant to flow through the radiator 102. The thermostatic valve 108 is useful for speeding up the engine warm-up and, during normal operation, for maintaining the coolant at a predetermined temperature. However, utilizing liquid coolant, or cooling system of any kind, generally requires at least auxiliary energy and components. This solution is not favorable since it adds weight to the system.

Existing prior art have failed to address the aforementioned limitation. In particular, existing prior art lack the capacity to provide a cooling system that avoids wastage of thermal energy in combustion engines. Therefore, there is need for a cooling system that avoids wastage of thermal energy in combustion engines and does not require auxiliary energy and components.

SUMMARY OF THE INVENTION

An automatic cooling system based on stirling engine for combustion engine is disclosed. The automatic cooling system is configured to operate the stirling engine using the thermal energy from the temperature difference between a radiator and the combustion engine.

The cooling system comprises an engine coolant circuit, a radiator, a first pipeline, a second pipeline, a coolant pump and the stirling engine. The engine coolant circuit comprises an engine coolant circuit inlet and an engine circuit coolant circuit outlet. The radiator comprises a radiator inlet and a radiator outlet. The first pipeline hydraulically connects the radiator outlet and the engine coolant circuit inlet. The second pipeline hydraulically connects the engine coolant circuit outlet and radiator inlet. The coolant pump located in the first pipeline is configured to pump a coolant to the engine coolant circuit inlet. The stirling heat engine is driven by thermal energy from a temperature difference between the combustion engine and the radiator. The stirling engine drives the coolant pump to circulate the coolant between the engine and the radiator. In one embodiment, the stirling engine is an alpha stirling engine.

If the temperature difference between the combustion engine and the radiator is high, the stirling engine automatically drives the coolant pump and circulates the coolant at high speed. If the temperature difference between the combustion engine and the radiator is low, the stirling engine automatically drives the coolant pump and circulates the coolant at low speed, until the temperature difference between the engine and radiator is within a threshold point.

Thus, the present invention enables automatic balance of the thermal energy in the radiator and the combustion engine. Further, the present invention eliminates the need for an actuator such as thermostat, a temperature sensor and a water pump coupled with the engine. The present invention further eliminates the need to provide separate energy for controlling engine temperatures. The present invention performs temperature control automatically using the thermal energy of the engine, which is usually wasted.

One aspect of the present disclosure is directed to a cooling system for combustion engine, comprising: (a) an engine coolant circuit having an engine coolant circuit inlet and an engine coolant circuit outlet; (b) a radiator having a radiator inlet and a radiator outlet; (c) a first pipeline hydraulically connects the radiator outlet and the engine coolant circuit inlet; (d) a second pipeline hydraulically connects the engine coolant circuit outlet and radiator inlet; (e) a coolant pump located in the first pipeline configured to pump a coolant to the engine coolant circuit inlet; and (f) a stirling heat engine driven by thermal energy from a temperature difference between the combustion engine and the radiator, wherein the stirling engine drives the coolant pump to circulate the coolant between the engine and the radiator.

In one embodiment, if the temperature difference between the combustion engine and the radiator is high, the stirling engine automatically drives the coolant pump and circulates the coolant at high speed. In another embodiment, if the temperature difference between the combustion engine and the radiator is low, the stirling engine automatically drives the coolant pump and circulates the coolant at low speed, until the temperature difference between the engine and radiator is within a threshold point. In one embodiment, the stirling engine and the coolant pump controlled by the thermal energy from temperature difference between the combustion engine and the radiator enables automatic balance of the thermal energy in the radiator and the combustion engine. In another embodiment, the stirling engine is an alpha stirling engine.

Another aspect of the present disclosure is directed to a cooling system for a combustion engine, comprising: (a) an engine coolant circuit having an engine coolant circuit inlet and an engine circuit coolant circuit outlet; (b) a radiator having a radiator inlet and a radiator outlet; (c) a first pipeline hydraulically connects the radiator outlet and the engine coolant circuit inlet; (d) a second pipeline hydraulically connects the engine coolant circuit outlet and radiator inlet; (e) a coolant pump located in the first pipeline configured to pump a coolant to the engine coolant circuit inlet; and (f) a stirling heat engine driven by thermal energy from a temperature difference between the combustion engine and the radiator, (i) wherein the stirling engine drives the coolant pump to circulate the coolant between the engine and the radiator, (ii) wherein if the temperature difference between the combustion engine and the radiator is high, the stirling engine automatically drives the coolant pump and circulates the coolant at high speed, and (iii) wherein if the temperature difference between the combustion engine and the radiator is low, the stirling engine automatically drives the coolant pump and circulates the coolant at low speed, until the temperature difference between the engine and radiator is within a threshold point.

In one embodiment, the stirling engine and the coolant pump controlled by the thermal energy from temperature difference between the combustion engine and the radiator enables automatic automatically balance of the thermal energy in the radiator and the combustion engine.

Another aspect of the present disclosure is directed to a cooling system for a combustion engine, comprising: an engine coolant circuit having an engine coolant circuit inlet and an engine circuit coolant circuit outlet; a radiator having a radiator inlet and a radiator outlet; a first pipeline hydraulically connects the radiator outlet and the engine coolant circuit inlet; a second pipeline hydraulically connects the engine coolant circuit outlet and radiator inlet; a coolant pump located in the first pipeline configured to pump a coolant to the engine coolant circuit inlet; and a stirling heat engine driven by thermal energy from a temperature difference between the combustion engine and the radiator, wherein the stirling engine drives the coolant pump to circulate the coolant between the engine and the radiator, and wherein the stirling engine is an alpha stirling engine.

Other objects, features and advantages of the present invention will become apparent from the following detailed description. It should be understood, however, that the detailed description and the specific examples, while indicating specific embodiments of the invention, are given by way of illustration only, since various changes and modifications within the spirit and scope of the invention will become apparent to those skilled in the art from this detailed description.

DETAILED DESCRIPTION

The present invention generally relates to a cooling system. More particularly, the present invention relates to an automatic cooling system of combustion engine operated using thermal energy from the temperature difference between a radiator and the combustion engine.

A description of embodiments of the present invention will now be given with reference to the figures. It is expected that the present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

Figure 2:
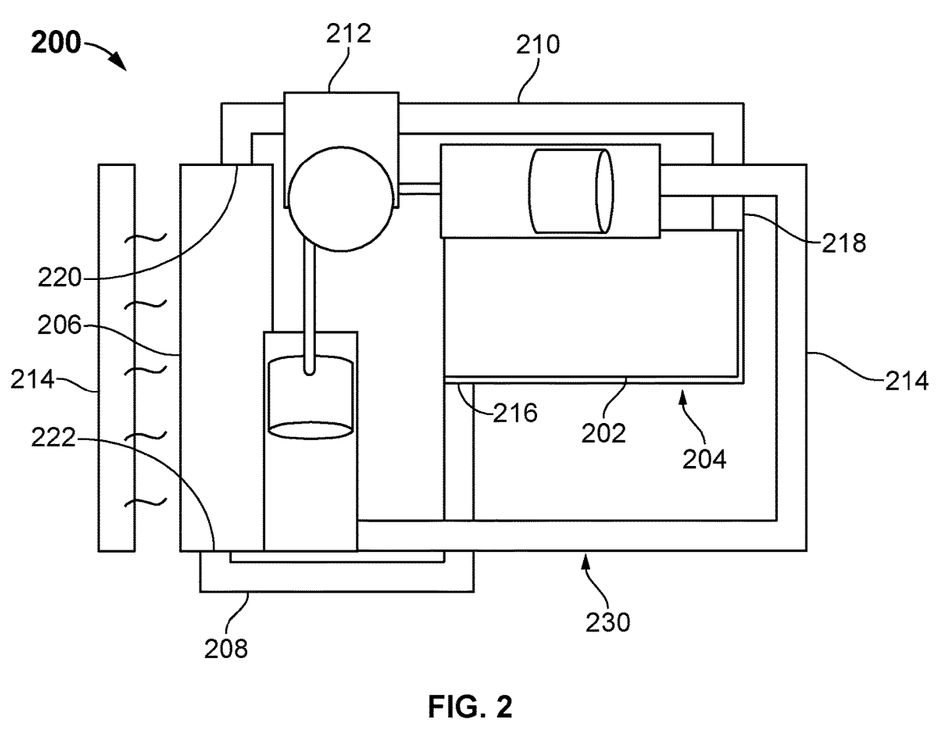
FIG. 2 exemplarily illustrates an automatic cooling system of a combustion engine according to an embodiment of the present invention.

Referring to FIG. 2, the present invention discloses an automatic cooling system 200 (hereinafter referred as system) for a combustion engine 202. The system 200 comprises an engine coolant circuit 204, a radiator 206, a first pipeline 208, a second pipeline 210, a coolant pump 212, a fan 214, and a stirling heat engine 230. The engine coolant circuit 204 comprises a plurality of hydraulically interconnected conducts, which are generally comprised in the engine crankcase, engine cylinder block and engine cylinder head. The engine coolant circuit 204 is provided with an engine coolant circuit inlet or a coolant inlet 216 and an engine circuit coolant circuit outlet or a coolant outlet 218 for a liquid coolant to flow through the hydraulically interconnected conducts. The coolant could be distilled water or preferably a mixture of water, antifreeze and other additives suitable for increasing cooling efficiency. In one embodiment, the coolant is oil. In one embodiment, the combustion engine 202 is an internal combustion engine.

The radiator 206 is a heat exchanger, wherein the heat of the coolant is generally transferred to a cooling medium flow through the radiator 206, such as environmental air by convection heat transfer. The radiator 206 is provided with a radiator inlet 220 and a radiator outlet 222 for the coolant. The radiator outlet 222 hydraulically communicates with the engine coolant inlet 216 via the first pipeline 208. The engine coolant outlet 218 hydraulically communicates with the radiator inlet 220 via the second pipeline 210, to obtain a closed hydraulic circuit. The primary coolant pump 212 configured to move the coolant towards the engine coolant inlet 216.

The stirling heat engine 230 is driven by the thermal energy from a temperature difference between the combustion engine 202 and the radiator 206. The stirling engine 230 drives the coolant pump to circulate the coolant between the engine 202 and the radiator 206. In one embodiment, the stirling engine 230 is an alpha stirling engine. If the temperature difference between the combustion engine 202 and the radiator 206 is high, the stirling engine 230 automatically drives the coolant pump 212 and circulates the coolant at high speed.

If the temperature difference between the combustion engine 202 and the radiator 206 is low, the stirling engine 230 automatically drives the coolant pump 212 and circulates the coolant at low speed, until the temperature difference between the engine 202 and radiator 206 within a threshold point. Thus, the present invention enables automatic balance of the thermal energy in the radiator 206 and the combustion engine 202.

Figure 3:
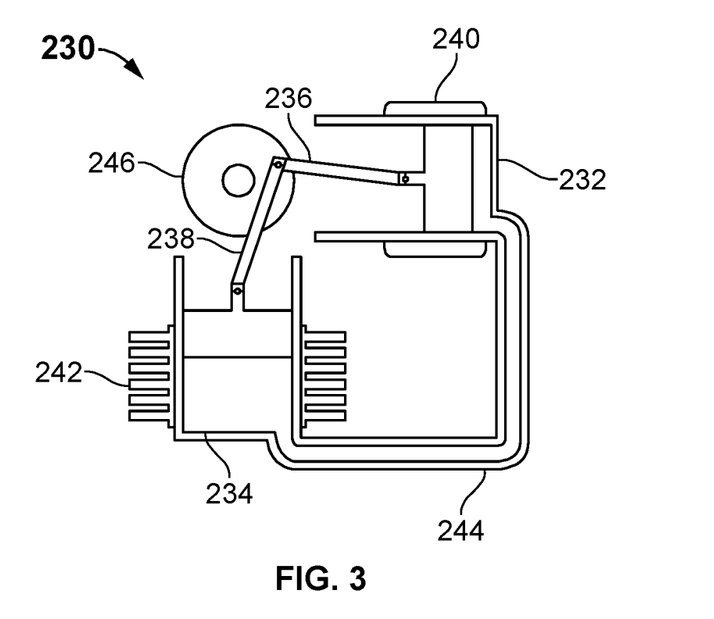
FIG. 3 exemplarily illustrates a stirling engine, according to one embodiment of the present invention.

Referring to FIG. 3, a perspective view of the stirling engine 230 that includes an alpha-stirling engine mechanism according to an embodiment of the present invention. In one embodiment, the stirling engine 230 is a two-cylinder alpha stirling engine. The stirling engine 230 comprises one or more cylinders, one or more heat exchanger, a regenerator 244, and a fly wheel assembly 246. The one or more cylinders include a first cylinder 232 and a second cylinder 234. In one embodiment, the first cylinder 232 is a high-temperature-side cylinder and the second cylinder 234 is a low temperature side cylinder that are arranged in series with each other.

Each cylinder (232 and 234) comprises a separate power piston assembly. The first cylinder or the high temperature side cylinder 232 comprises a first power piston assembly 236. The second cylinder or the low temperature side cylinder 234 comprises a second power piston assembly 238. The power piston assemblies (236 and 238) are connected via the flywheel assembly 246, which maintains the combined rotation of the piston assemblies (236 and 238).

In one embodiment, the one or more heat exchanger includes, a first heat exchanger 240 and a second heat exchanger 242. The first heat exchanger 240 is a high temperature heat exchanger such as heater. The second heat exchanger 242 is a low temperature heat exchanger such as cooler. In one embodiment, the high temperature side cylinder 232 is situated inside the high temperature heat exchanger 240 and the low temperature side cylinder 234 situated inside the second heat exchanger 242. In one embodiment, the regenerator 244 is placed in the pipeline connecting the high temperature side cylinder 232 and the low temperature side cylinder 234. In one embodiment, the operation of stirling engine 230 could be divided in 4-different phases. In one embodiment, the stirling engine 230 is a closed-cycle regenerative heat engine, which utilizes a gaseous working fluid.

Referring to FIGS. 4-7, the operation of the stirling engine 230 in four-different phases are explained in detail. The stirling engine 230 is a heat engine that operates by a cyclic compression and expansion of the working fluid at different temperatures, such that there is a net conversion of heat energy to mechanical work. In one embodiment, the working fluid could be air or other gas. In one embodiment, the process is repeated and automates the cooling process without manual intervention.

Figure 4:
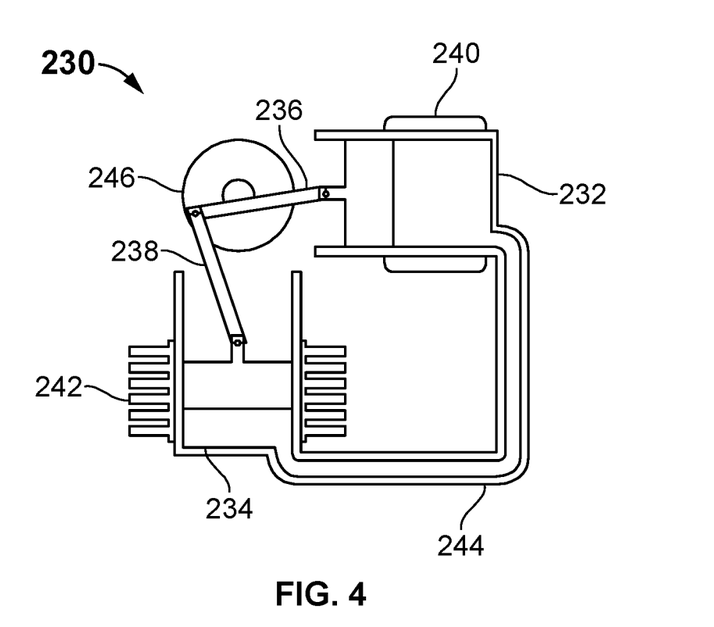
FIG. 4 exemplarily illustrates an operation of the stirling engine at phase-1 according to one embodiment of the present invention.

Referring to FIG. 4, the operation of the stirling engine 230 at phase-1 involves expansion of working fluid such as gas, where the maximum amount of gas is in the high temperature side cylinder 232. The working fluid in the high temperature side cylinder 232 has more contact with the hot cylinder walls, which results in overall heating of the gas. Due to heating, the gas expands and increases the gas pressure inside the high temperature side cylinder 232 to maximum volume. The low temperature side cylinder 234 is at the top stroke and has the minimum volume. As the high temperature side cylinder 232 has the maximum volume and the low temperature side cylinder 234 is at the top stroke (minimum volume), the volume of the cooling system 200 is increased by expansion into the low temperature side cylinder 234.

Figure 5:
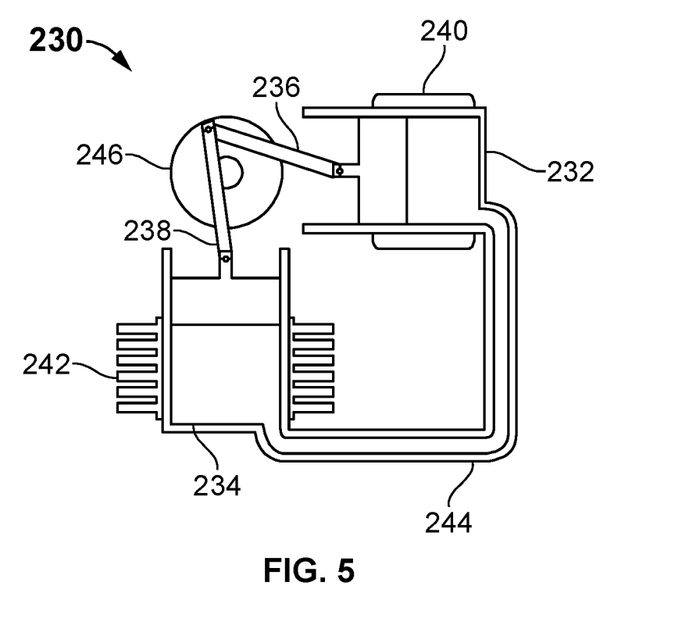
FIG. 5 exemplarily illustrates an operation of the stirling engine at phase-2 according to one embodiment of the present invention.

Referring to FIG. 5, the operation of the stirling engine 230 at phase-2 involves cooling of working fluid or gas, where the system 200 is at its maximum volume. At phase 2, the gas has more contact with the low temperature side cylinder 234, where the temperature and pressure of the gas is reduced. In one embodiment, the first piston assembly 236 and the second piston assembly 238 are at the same shaft in the flywheel assembly 246, wherein each stroke of the cylinders (232 and 234) is achieved via the flywheel assembly 246. The high temperature side cylinder 232 begins an upstroke, thereby reducing the volume of the system 200 via flywheel momentum.

Figure 6:
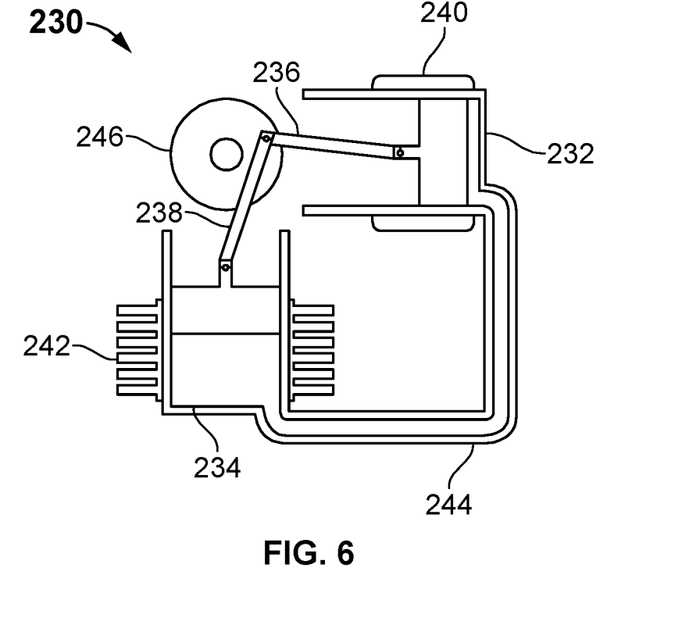
FIG. 6 exemplarily illustrates an operation of the stirling engine at phase-3 according to one embodiment of the present invention, and FIG. 7 exemplarily illustrates an operation of the stirling engine at phase-4 according to one embodiment of the present invention.

Referring to FIG. 6, the operation of the stirling engine 230 at phase-3 involves compression of working fluid or gas, where all the gas is in the low temperature side cylinder 234. At phase 3, the cooling process reduces the pressure and cause contraction of the gas. As the high temperature side cylinder 232 is at minimum volume and the low temperature side cylinder 234 is at maximum volume, the volume of the system 200 is further reduced by the compression of the gas in the low temperature side cylinder 234.

Figure 7:
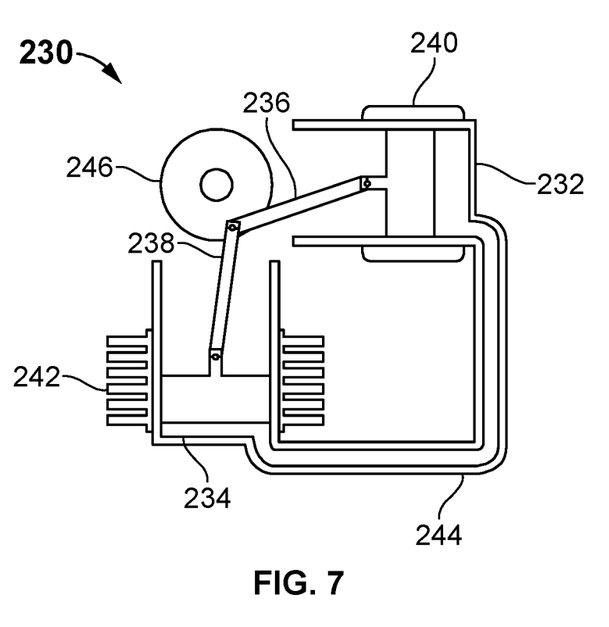

Referring to FIG. 7, the operation of the stirling engine 230 at phase-4 involves expansion of working fluid or gas, where the system 200 has minimum volume. At phase 4, the gas has more contact with the high temperature side cylinder 232, which results in overall heating of the gas. Due to heating, the gas expands and increases the gas pressure inside the high temperature side cylinder 232. The volume of the system 200 is increased as the gas expands in the high temperature side cylinder 232.

Advantageously, the cooling system 200 utilizes the temperature difference between the radiator 206 and the combustion engine 202. If the temperature difference between the radiator 206 and the combustion engine 202 is high, the temperature control is speeds up using the stirling engine 230. Further, the automatic cooling system using the stirling engine 230 eliminates the need of separate energy source for controlling the engine temperatures and temperature control. The heat energy wasted during the conversion of heat energy into mechanical movement is utilized to control the engine temperature. The temperature of the combustion engine 202 is controlled automatically. Further, the present invention eliminates the need for an actuator such as thermostat, a temperature sensor and a water pump coupled with the engine. The present invention performs temperature control automatically using the thermal energy of the engine, which is usually wasted.

The foregoing description comprise illustrative embodiments of the present invention. Having thus described exemplary embodiments of the present invention, it should be noted by those skilled in the art that the within disclosures are exemplary only, and that various other alternatives, adaptations, and modifications may be made within the scope of the present invention. Merely listing or numbering the steps of a method in a certain order does not constitute any limitation on the order of the steps of that method.

Many modifications and other embodiments of the invention will come to mind to one skilled in the art to which this invention pertains having the benefit of the teachings presented in the foregoing descriptions. Although specific terms may be employed herein, they are used only in generic and descriptive sense and not for purposes of limitation. Accordingly, the present invention is not limited to the specific embodiments illustrated herein. While the above is a complete description of the preferred embodiments of the invention, various alternatives, modifications, and equivalents may be used. Therefore, the above description and the examples should not be taken as limiting the scope of the invention, which is defined by the appended claims.

What is claimed is:

1. A cooling system for a combustion engine, comprising:
  an engine coolant circuit having an engine coolant circuit inlet and an engine coolant circuit outlet;
  a radiator having a radiator inlet and a radiator outlet;
  a first pipeline hydraulically connects the radiator outlet and the engine coolant circuit inlet;
  a second pipeline hydraulically connects the engine coolant circuit outlet and radiator inlet;
  a coolant pump located in the first pipeline or the second pipeline and configured to pump a coolant to the engine coolant circuit inlet, and a stirling heat engine driven by thermal energy from a temperature difference between the combustion engine and the radiator, the stirling heat engine either comprising a cooler located adjacent to the radiator or comprising a cooler located in close proximity to the radiator such that a cooling medium flow through the radiator directly cools the cooler of the stirling engine, wherein the stirling engine drives the coolant pump to circulate the coolant between the engine and the radiator.

2. The cooling system of claim 1, wherein if the temperature difference between the combustion engine and the radiator is high, the stirling engine automatically drives the coolant pump and circulates the coolant at high speed.

3. The cooling system of claim 1, wherein if the temperature difference between the combustion engine and the radiator is low, the stirling engine automatically drives the coolant pump and circulates the coolant at low speed, until the temperature difference between the engine and radiator is within a threshold point.

4. The cooling system of claim 1, wherein the stirling engine and the coolant pump controlled by the thermal energy from temperature difference between the combustion engine and the radiator enables automatic balance of the thermal energy in the radiator and the combustion engine.

5. The cooling system of claim 1, wherein the stirling engine is an alpha stirling engine.

6. The cooling system of claim 1, wherein the first pipeline and the second pipeline are continuous pathways with no branches or bypasses.

7. The cooling system of claim 1, wherein the engine coolant circuit does not comprise a valve for controlling coolant flow through the radiator.

8. The cooling system of claim 1, wherein the engine coolant circuit does not comprise a temperature sensor for controlling coolant flow through the radiator.

9. The cooling system of claim 1, wherein the engine coolant circuit does not comprise a second coolant pump to pump the coolant.

10. A cooling system for a combustion engine, comprising:
   an engine coolant circuit having an engine coolant circuit inlet and an engine circuit coolant circuit outlet;
   a radiator having a radiator inlet and a radiator outlet;
   a first pipeline hydraulically connects the radiator outlet and the engine coolant circuit inlet;
   a second pipeline hydraulically connects the engine coolant circuit outlet and radiator inlet;
   a coolant pump located in the first pipeline or the second pipeline and configured to pump a coolant to the engine coolant circuit inlet, and
   a stirling heat engine driven by thermal energy from a temperature difference between the combustion engine and the radiator,
      the stirling heat engine either comprising a cooler located adjacent to the radiator or comprising a cooler located in close proximity to the radiator such that a cooling medium flow through the radiator directly cools the cooler of the stirling engine,
      wherein the stirling engine drives the coolant pump to circulate the coolant between the engine and the radiator;
      wherein if the temperature difference between the combustion engine and the radiator is high, the stirling engine automatically drives the coolant pump and circulates the coolant at high speed, and
      wherein if the temperature difference between the combustion engine and the radiator is low, the stirling engine automatically drives the coolant pump and circulates the coolant at low speed, until the temperature difference between the engine and radiator is within a threshold point.

11. The cooling system of claim 10, wherein the stirling engine and the coolant pump controlled by the thermal energy from temperature difference between the combustion engine and the radiator enables automatic balance of the thermal energy in the radiator and the combustion engine.

12. The cooling system of claim 10, wherein the stirling engine is an alpha stirling engine.

13. The cooling system of claim 10, wherein the first pipeline and the second pipeline are continuous pathways with no branches or bypasses.

14. The cooling system of claim 10, wherein the engine coolant circuit does not comprise a valve for controlling coolant flow through the radiator.

15. The cooling system of claim 10, wherein the engine coolant circuit does not comprise a temperature sensor for controlling coolant flow through the radiator.

16. The cooling system of claim 10, wherein the engine coolant circuit does not comprise a second coolant pump to pump the coolant.

* * * * *